US009678776B2

(12) United States Patent
Gomes

(10) Patent No.: US 9,678,776 B2
(45) Date of Patent: Jun. 13, 2017

(54) SUPPRESS NEWER FACILITIES WHEN SIMULATING AN OLDER MACHINE

(75) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1025 days.

(21) Appl. No.: 13/340,750

(22) Filed: Dec. 30, 2011

(65) Prior Publication Data
US 2013/0173244 A1    Jul. 4, 2013

(51) Int. Cl.
G06F 9/44 (2006.01)
G06F 9/455 (2006.01)

(52) U.S. Cl.
CPC ............ *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 4,792,895 A | 12/1988 | Tallman | |
| 7,006,963 B1 | 2/2006 | Maurer | |
| 7,660,710 B2 * | 2/2010 | Sirrine | 703/8 |
| 2009/0070760 A1 * | 3/2009 | Khatri et al. | 718/1 |

OTHER PUBLICATIONS

IP.com Article, No. IPCOM000174174D, Date: Aug. 30, 2008, entitled "Code Path Test Coverage Maximizer", 3 pages.
IP.com Article, No. IPCOM000201829D, Date: Nov. 24, 2010, entitled "Method of Performing Run Time Code Path Analysis", 5 pages.
VAL Architecture (AR-10321-08) p. 3-2 entitled "Instruction-Blocking Control", May 20, 2009.

* cited by examiner

*Primary Examiner* — Omar Fernandez Rivas
*Assistant Examiner* — Herng-Der Day
(74) *Attorney, Agent, or Firm* — Cantor Colburn LLP; Steven Chiu

(57) ABSTRACT

Suppressing enabled newer facilities of an older simulated machine. This makes the native machine appear just like the corresponding older simulated machine. The invention creates the Allowed Facilities Table (AFT) that includes all the facilities of each simulated machine that needs to be supported and queries all the installed facilities of the simulated machine. It reads each machine facility of the simulated machine and checks the AFT that includes the state of all the facilities that are allowed to be enabled for the simulated machine to see if this installed facility is also enabled in the AFT. If the installed facility is also enabled in the AFT, then this facility may be used by the software without any problems. Otherwise, this facility should not be used. A system and program product for carrying out the method are included.

3 Claims, 2 Drawing Sheets

SUPPRESS NEWER FACILITIES WHEN SIMULATING AN OLDER MACHINE

BACKGROUND OF THE INVENTION

1. Field of the Invention

The present invention relates to computer systems and more particularly to virtual machine systems and suppressing enabled facilities that are not available on an older physical machine being simulated.

2. Description of the Related Art

Typically, software takes advantage of all the new facilities that are enabled on the physical (real) machine for which the software has support. This approach works well when running on a physical machine. One problem with keeping single source code for the latest as well as older physical machines of the same family is that one would have to keep all the physical machines of the same family which the software supports so that the software may be tested on them to make sure the software works on all the physical machines which the software supports. One reason for needing software to support older machines is that not all users may have the latest physical machine. However, it is costly to keep older physical machines just for software compatibility testing.

SUMMARY OF THE INVENTION

According to an aspect of the invention, a method to suppress facilities on a physical machine is provided. The method includes: creating, by a computer processor, at least one Allowed Facilities Table (AFT) wherein the AFT contains information about simulated machine facilities (SMFs) which are allowed to be enabled on a first simulated machine; determining, by a computer processor, which machine facilities are actually enabled on the first simulated machine; creating, by a computer processor, an Installed Facilities Table (IFT) based on the Allowed Facilities Table (AFT) and the facilities which are determined to be enabled; and allowing the first simulated machine to access only the facilities which are enabled on the Installed Facilities Table (IFT).

According to another aspect of the invention, a computer program product to suppress facilities on a physical machine is provided. The computer program product includes a non-transient computer readable storage medium having computer readable program code embodied therewith, the computer readable program code configured to carry out the steps of a method. The method includes the steps of: creating, by a computer processor, at least one Allowed Facilities Table (AFT) where the AFT contains information about simulated machine facilities (SMFs) which are allowed to be enabled on a first simulated machine; determining, by a computer processor, which machine facilities are enabled on the first simulated machine; creating, by a computer processor, an Installed Facilities Table (IFT) based on the Allowed Facilities Table (AFT) and the facilities which are determined to be enabled; and allowing the first simulated machine to access only the facilities which are enabled on the Installed Facilities Table (IFT).

According to another aspect of the invention, a system to suppress facilities on a physical machine is provided. The system includes: a memory; and a processor configured to communicate with the memory, wherein the computer system is configured to perform a method. The method includes: creating, by a computer processor, at least one Allowed Facilities Table (AFT) wherein the AFT contains information about simulated machine facilities (SMFs) which are allowed to be enabled on a first simulated machine; determining, by a computer processor, which machine facilities are enabled on the first simulated machine; creating, by a computer processor, an Installed Facilities Table (IFT) based on the Allowed Facilities Table (AFT) and the facilities which are determined to be enabled; and allowing the first simulated machine to access only the facilities which are enabled on the Installed Facilities Table (IFT).

The invention provides a solution to suppress all the enabled facilities that are not available on the older physical machine being simulated using the Operating System (OS) or the Application Program (AP). Furthermore, the invention may also suppress both the newer and the older enabled facilities that are not available on the older physical machine being simulated which enable the simulated machine to appear just like the corresponding older physical machine being simulated to the software.

Additional benefits are that the main part of the software would not have to change to support multiple machines of the same family, and software errors on the simulated machine when one or more facilities that are not part of the older physical machine are enabled by the simulated machine are eliminated. In addition, the invention improves software performance by cutting the code path for checking the appropriate facility to a minimum and saves the cost of not owning the older physical machines.

DETAILED DESCRIPTION OF THE PREFERRED EMBODIMENTS

Figure 1:
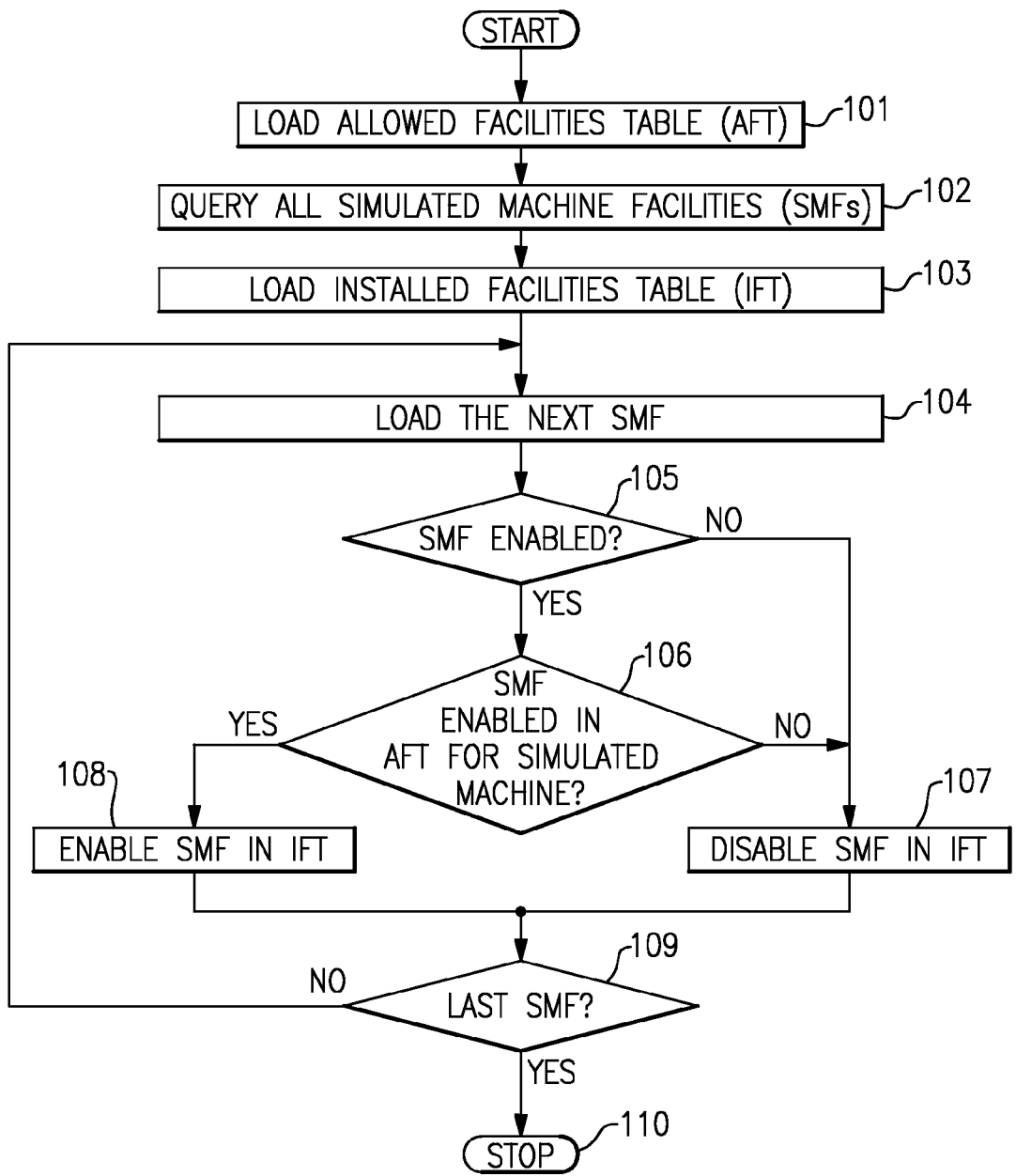
FIG. 1. is a diagram of an embodiment of the invention incorporating an Installed Facilities Table.

The Virtual Architecture Level (VAL) Architecture for IBM System z Mainframe (AR-10321-08, The Virtual-Architecture-Level Instruction-Blocking Facility, dated May 20, 2009) allows a newer physical machine to simulate older physical machine models (simulated machine). The newer physical machine does this by disabling certain facilities and instructions to match the older physical machine model facilities and instructions. However, the VAL architecture allows the newer physical machine to keep facilities that are not part of the simulated machine but is part of a physical machine that is newer than the simulated machine. If the simulated machine does not disable a new facility that is not available on the older physical machine being simulated and this new facility adds new functions to an existing instruction, the execution of one of those new functions by the software would produce unpredictable results. The simulated machine may not recognize the new function (simulated machine behavior), or may execute the new function as defined by the new architecture (newer machine behavior). Since the hardware/firmware may not disable all the facilities that are not available on the older physical machine being simulated, a solution is needed to recognize the enabled new facilities and develop a new method to suppress them.

One way to solve this problem is to define a feature list of all the functions of all the instructions that have been introduced via new physical machine facilities (at least up to the oldest physical machine that may be simulated), perform a physical feature check of each of those new functions that is enabled but is not part of the simulated machine architecture, and set the corresponding feature based on the results of the execution of the enabled new function. However, in many cases, the execution of the enabled new function is insufficient to reap the benefits of the new architecture since all the new instructions of the new architecture would still be disabled and therefore this method is not desirable.

Also, one of the benefits of using a newer physical machine to simulate an older physical machine is to allow the software to test the code as if it is running on the older physical machine that is being represented by the simulated machine. The software is not really interested in executing any new function that is not part of the older physical machine being simulated. For example, the software may be run on a simulated machine to make sure the software still operates properly (transparent and/or regression test) on the corresponding older physical machine without actually running on that older physical machine and thus saving the cost of not owning the older physical machines.

This invention suppresses all the enabled facilities that are not available on the older physical machine being simulated by using, for example, the Operating System (OS) or the Application Program (AP). This approach makes the simulated machine appear just like the corresponding older physical machine it is simulating to the software, and the main part of the software would not have to change to support multiple machines of the same family. It suppresses both the newer and the older enabled facilities that are not available on the older physical machine being simulated. It also improves software performance by cutting the code path for checking the appropriate facility to a minimum.

Since the VAL Architecture does not require the newer physical machine to disable facilities that are newer than the older physical machine being simulated, the hardware/firmware of the newer physical machine does not have to disable all the facilities that are newer than the older physical machine being simulated. So if the newer physical machine does not disable a new facility that is not available on the older physical machine being simulated and this new facility adds new functions to at least one existing instruction, the execution of one of those new functions by the software would produce unpredictable results. Much more time and investment would be needed to upgrade the software to avoid getting incorrect results (physical feature check of all the new functions for example).

An exemplary embodiment of the invention creates the Allowed Facilities Table (AFT) that includes all the facilities of each simulated machine that needs to be supported and queries all the installed facilities of the simulated machine. It reads each machine facility of the simulated machine and checks the AFT (that includes the state of all the facilities that are allowed to be enabled for the simulated machine) to see if this installed facility is also enabled in the AFT. If the installed facility is also enabled in the AFT, then this facility may be used by the software without any problems. Otherwise, this facility should not be used by the software because this facility is not enabled in the older physical machine being simulated and executing the enhancements of this facility may produce unpredictable results by the simulated machine. This approach also cuts the code path for checking the appropriate facility to a minimum which improves software performance.

The Allowed Facilities Table (AFT) includes the allowed state of all the facilities of each older physical machine that needs to be simulated. The AFT may be created several ways. For example, there may be a separate AFT for each older physical machine that needs to be simulated or a master AFT for all the older physical machines that need to be simulated. The software also creates the Installed Facilities Table (IFT) that includes all the facilities of the older physical machine being simulated. The facilities list for AFT and IFT should include all the facilities from the oldest physical machine that can be simulated to the latest physical machine that is supported by the software and can be used to simulate an older physical machine. This rule would remove the possibility of undefined facility variables in AFT or IFT.

AFT is used as the input for deciding whether or not to suppress the installed facilities. IFT contains the output of the decisions made using AFT as the input and should be used to determine each facility enablement. It represents the local (scrubbed) copy of the installed machine facilities of the simulated machine and should represent the true installed machine facilities of the older physical machine being simulated.

Either the OS or the AP may create the AFT/IFT. If the AP creates the AFT/IFT, there would be multiple AFTs/IFTs—one for each application program; this may create duplicate AFTs/IFTs, especially when multiple instances of the same application program are running concurrently and therefore not the preferred method. Thus, the OS should be used to create a single AFT/IFT.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1 depicts how the method suppresses all the enabled (newer and older) facilities that are not available on the older physical machine being simulated using IFT. In 101, the method loads the AFT and points to all the facilities of the older physical machine being simulated. Then in 102, the method queries all the simulated machine facilities (SMFs) of the simulated machine. The IFT, which is loaded in 103, will include all the facilities that are both enabled on the simulated machine and are allowed to be enabled on the older physical machine being simulated.

The method reads each SMF of the simulated machine and processes them one at a time as described below. It reads the SMF of the simulated machine in 104. If the SMF is enabled in the simulated machine at 105, the software checks the AFT in 106 to see if this installed SMF is also enabled in the AFT (allowed to be installed in the older physical machine being simulated). Otherwise, the SMF is disabled in the IFT 107. If the installed SMF is also enabled in the AFT, the installed SMF is enabled in the IFT to indicate that this facility may be used by the software without any problems as shown in 108. Otherwise, the SMF is disabled in the IFT 107 (to indicate that this facility should not be used by the software because executing the enhancements of this facility may produce unpredictable results by the simulated machine).

If the current SMF being processed is not the last SMF that is queried as represented in 109, the method processes the next SMF by using the above process. Otherwise, the processing of all the SMFs is complete 110 and the IFT is ready to be used (instead of the SMFs themselves) by the software. All the enabled facilities in the IFT should now include only the facilities that may be enabled by the older physical machine being simulated. This process should be done at some common point before inspecting any SMF (during OS initialization for example) so that none of the machine facility checks in the software needs to be changed.

It is not necessary to create, update, and use IFT. If IFT is not used, the decision must be made each time to see if the enabled SMF should be used based on the SMF state in the AFT. However, not using IFT may make the code path longer and therefore not preferred (the same enabled SMF being inspected repeatedly for example).

Figure 2:
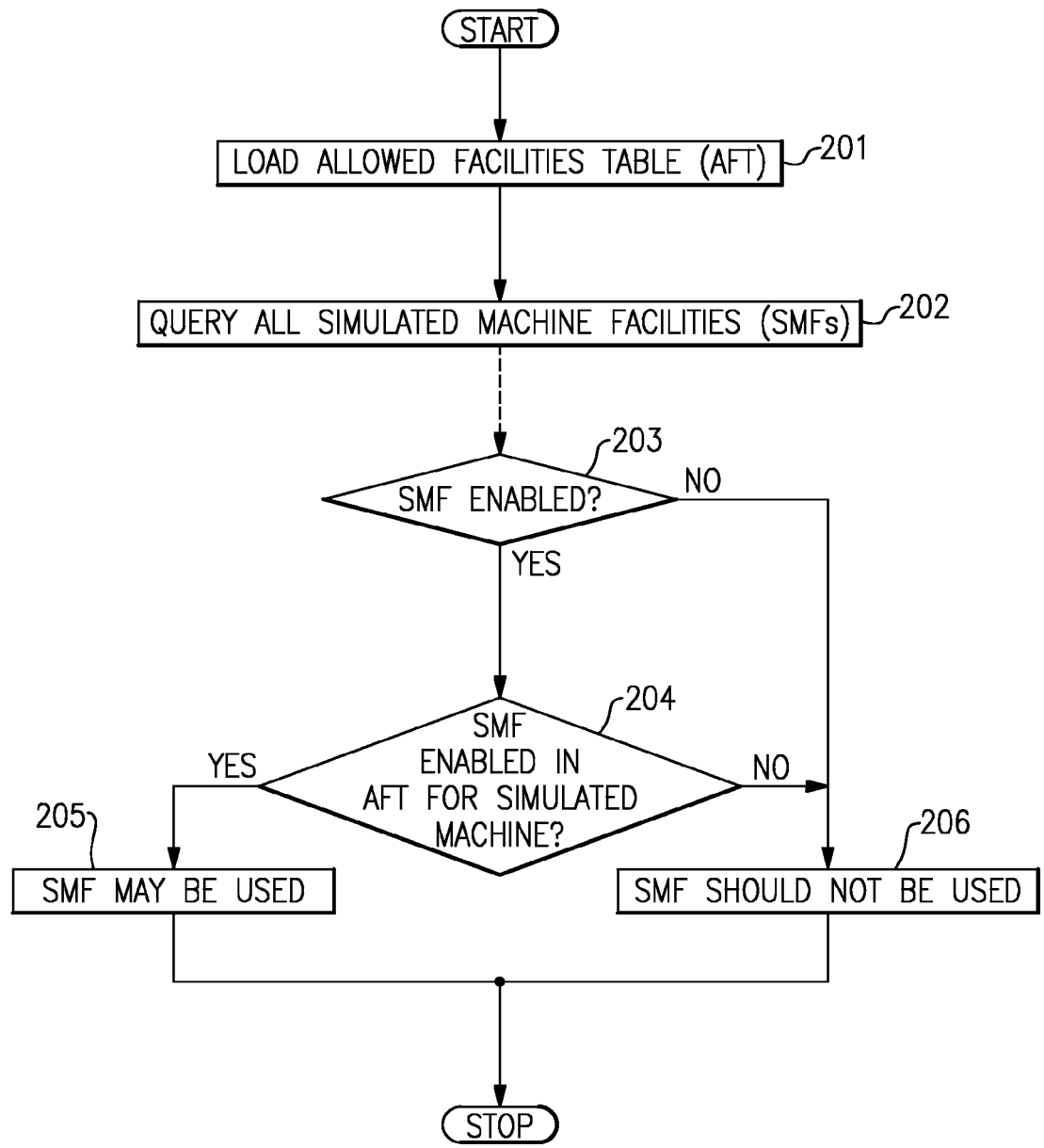
FIG. 2. is a diagram of an embodiment of the invention that does not use an Installed Facilities Table.

FIG. 2 depicts how the software suppresses the enabled (newer or older) facilities that are not available on the older physical machine being simulated without using IFT. The software loads the AFT in 201 and points to all the facilities of the older physical machine being simulated and queries all the simulated machine facilities (SMFs) of the simulated machine in 202. This part should be done at some common point before inspecting any SMF, during OS initialization for example. The software then checks the desired SMF of the simulated machine. If the SMF is enabled in the simulated machine in 203, the software checks the AFT in 204 to see if this installed SMF is also enabled in the AFT (allowed to be installed in the older physical machine being simulated). Otherwise, the SMF should not be used by the software in 206. If the installed SMF is also enabled in the AFT, the installed SMF may be used by the software without any problems in 205. Otherwise, the SMF should not be used by the software in 206 because this facility is not enabled in the older physical machine being simulated and executing the enhancements of this facility may produce unpredictable results by the simulated machine.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention through various embodiments and the various modifications thereto which are dependent on the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

I claim:

1. A method to suppress a facility subset using an installed facilities table, the method comprising:
    simulating, by an operating system executed by a computer processor of a physical machine, an old machine model within a virtual machine system to produce a simulated machine, wherein the virtual machine system is executed on the physical machine comprising machine hardware that is new with respect to the old machine model, wherein the machine hardware provides facilities that are not allowed on the old machine model;
    creating an allowed facilities table and the installed facilities table using the operating system;
    loading the allowed facilities table that points to facilities of the old machine model;
    querying, during an operating system initialization of the virtual machine system, facilities being executed by the simulated machine facilities, wherein the facilities that are not allowed on the old machine model are included in the facilities being executed by the simulated machine;
    loading the installed facilities table to comprise the facilities of the old machine model and the facilities being executed by the simulated machine based on the loading of the allowed facilities table and the querying of the facilities being executed by the simulated machine;
    determining the facility subset by:
        individually reading each of the facilities being executed by the simulated machine,
        checking whether each facility of the facilities being executed by the simulated machine is identified within the allowed facilities table, and
        disabling each facility of the facilities being executed by the simulated machine within the installed facilities table that is not identified by the allowed facilities table,
        wherein the facility subset comprises each disabled facility within the installed facilities table, and
        wherein each disabled facility within the installed facilities table is one of the facilities, provided by the machine hardware, that are not allowed on the old machine model; and
    suppressing the facility subset by allowing the simulated machine to access only facilities of the installed facilities table that are not disabled.

2. A computer program product comprising a non-transitory computer readable storage medium having program instructions to suppress a facility subset using an installed facilities table embodied therewith, the program instructions executable by a computer processor of a physical machine to cause the physical machine to perform:
    simulating, by an operating system executed by the computer processor of the physical machine, an old machine model within a virtual machine system to produce a simulated machine, wherein the virtual machine system is executed on the physical machine comprising machine hardware that is new with respect to the old machine model, wherein the machine hardware provides facilities that are not allowed on the old machine model;
    creating an allowed facilities table and the installed facilities table using the operating system;
    loading the allowed facilities table that points to facilities of the old machine model;
    querying, during an operating system initialization of the virtual machine system, facilities being executed by the simulated machine facilities, wherein the facilities that are not allowed on the old machine model are included in the facilities being executed by the simulated machine;
    loading the installed facilities table to comprise the facilities of the old machine model and the facilities being executed by the simulated machine based on the loading of the allowed facilities table and the querying of the facilities being executed by the simulated machine;
    determining the facility subset by:
        individually reading each of the facilities being executed by the simulated machine,
        checking whether each facility of the facilities being executed by the simulated machine is identified within the allowed facilities table, and
        disabling each facility of the facilities being executed by the simulated machine within the installed facilities table that is not identified by the allowed facilities table,
        wherein the facility subset comprises each disabled facility within the installed facilities table, and
        wherein each disabled facility within the installed facilities table is one of the facilities, provided by the machine hardware, that are not allowed on the old machine model; and
    suppressing the facility subset by allowing the simulated machine to access only facilities of the installed facilities table that are not disabled.

3. A physical machine comprising a computer processor and a memory, the memory configured to store instructions to suppress a facility subset using an installed facilities table, the computer processor configured to execute the instructions to cause the physical machine to perform:

simulating, by an operating system executed by the computer processor of the physical machine, an old machine model within a virtual machine system to produce a simulated machine, wherein the virtual machine system is executed on the physical machine comprising machine hardware that is new with respect to the old machine model, wherein the machine hardware provides facilities that are not allowed on the old machine model;

creating an allowed facilities table and the installed facilities table using the operating system;

loading the allowed facilities table that points to facilities of the old machine model;

querying, during an operating system initialization of the virtual machine system, facilities being executed by the simulated machine facilities, wherein the facilities that are not allowed on the old machine model are included in the facilities being executed by the simulated machine;

loading the installed facilities table to comprise the facilities of the old machine model and the facilities being executed by the simulated machine based on the loading of the allowed facilities table and the querying of the facilities being executed by the simulated machine;

determining the facility subset by:
   individually reading each of the facilities being executed by the simulated machine,
   checking whether each facility of the facilities being executed by the simulated machine is identified within the allowed facilities table, and
   disabling each facility of the facilities being executed by the simulated machine within the installed facilities table that is not identified by the allowed facilities table,
   wherein the facility subset comprises each disabled facility within the installed facilities table, and
   wherein each disabled facility within the installed facilities table is one of the facilities, provided by the machine hardware, that are not allowed on the old machine model; and suppressing the facility subset by allowing the simulated machine to access only facilities of the installed facilities table that are not disabled.

\* \* \* \* \*